United States Patent [19]

Mueller et al.

[11] Patent Number: 5,787,855
[45] Date of Patent: Aug. 4, 1998

[54] METHOD FOR CYLINDER CUTOUT IN AN INTERNAL COMBUSTION ENGINE

[75] Inventors: Stephan Mueller, Leonberg; Dietmar Schwarzenthal, Ditzingen, both of Germany

[73] Assignee: Ing. h.c.F. Porsche AG, Germany

[21] Appl. No.: 635,138

[22] Filed: Apr. 19, 1996

[30] Foreign Application Priority Data

Apr. 19, 1995 [DE] Germany .................... 195 13 891.0

[51] Int. Cl.$^6$ ........................................ F02B 77/00
[52] U.S. Cl. ............................ 123/198 F; 123/481
[58] Field of Search ..................... 123/198 F, 481

[56] References Cited

U.S. PATENT DOCUMENTS 5,425,335  6/1995  Miyamoto et al. ............ 123/198 F

*Primary Examiner*—Noah P. Kamen
*Attorney, Agent, or Firm*—Evenson, McKeown, Edwards & Lenahan, P.L.L.C.

[57] ABSTRACT

A method for cylinder cutout in an internal combustion engine, with the engine having charge exchange valves on a portion of its cylinders. The charge exchange valves can be cut out as well as a switchable fuel supply, both of which can be switched from a cut-out or cut-off state to a cut-in state and vice versa. In order to provide a method for cylinder cutout that permits a safe transition from operation in which they are not cut out to one in which they are cut out, and by which the effects of cylinder cutout on fuel consumption and exhaust behavior are minimized, the fuel supply and the charge exchange valves may be cut out separately or in parallel. Before cylinder cutout, both the time required to cut out the charge exchange valves and the time required to cut off the fuel supply are calculated. Then these two times are compared and a waiting time is determined for the shorter process. When the next reference mark on the internal combustion engine is reached, both processes can proceed independently. The longer process is started immediately and the shorter process starts after the waiting time determined previously has expired.

12 Claims, 4 Drawing Sheets

METHOD FOR CYLINDER CUTOUT IN AN INTERNAL COMBUSTION ENGINE

BACKGROUND AND SUMMARY OF THE INVENTION

The invention relates to a method for cylinder cutout in an internal combustion engine, with the engine having charge exchange valves that can be cut out on a portion of its cylinders, and a switchable fuel supply, both of which can be switched from a cut-in or activated state to a cutout or deactivated state and vice versa.

In order to be able to operate internal combustion engines economically in load states that are significantly below the full load state, only a portion of the cylinders are fired. Consequently, these cylinders are operated at high load and hence close to the point of their minimum specific consumption.

To cut out the cylinders, the fuel supply is cut off and the gas exchange valves of those cylinders are stopped, so that no gas exchange losses occur in those cylinders that are cut out.

One possible cylinder cutout method comprises first cutting off the fuel supply to the cylinders to be cut out and then, after a predefined waiting time, shutting off the gas exchange valves as well. This method suffers from the disadvantage that gas exchange losses occur for an unnecessary period of time. In addition, during the time when the fuel supply is cut off but air is still delivered through the cylinders that have been cut out, the exhaust is highly diluted and cooled, so that a catalytic converter connected to the internal combustion engine can no longer operate properly.

Hence a goal of the invention is to provide a cylinder cutout method that permits a safe transition from operation with cylinders not cut out to operation with cylinders cut out, and to minimize the influence of cylinder cutout on fuel consumption and exhaust behavior.

These and other goals have been accomplished according to the present invention by providing a method for cylinder cutout in an internal combustion engine having a plurality of cylinders, at least one of the cylinders having switchable gas exchange valves and a switchable fuel supply, the switchable gas exchange valves and the switchable fuel supply being switchable between a cut-in state and a cutout state, wherein the method comprises the steps of: determining a valve cutout time required to cut out the gas exchange valves; determining a fuel cutout time required to cut out the fuel supply; comparing the valve cutout time with the fuel cutout time; determining a fuel cutout waiting time for initiating a cutout of the fuel supply, when the fuel cutout time is shorter than the valve cutout time; determining a valve cutout waiting time for initiating a cutout of the gas exchange valves, when the fuel cutout time is longer than the valve cutout time; and initiating the cutout of the gas exchange valves and the cutout of the fuel supply after reaching a next reference mark of the internal combustion engine and after a subsequent expiration of the respective waiting times.

According to the invention, provision is made to handle the cutoff of the fuel supply and the shutoff of the gas exchange valves separately and in parallel. Before the cylinders are cut out, the time required to shut off the gas exchange valves and the time required to cut off the fuel supply are calculated. Then the two times determined in advance are compared and a waiting time is determined for the process which will take less time. When the next reference mark of the internal combustion engine is reached, both processes can proceed independently. The process that lasts longer is started immediately and the process that lasts for a shorter time starts after the waiting time determined previously has elapsed. This method adjusts the two processes optimally to one another, since the fuel supply is cut off and the gas exchange valves are shut off at the same time. The gas exchange losses and hence the change in the exhaust are limited to the shortest possible time. Thus, the disadvantages described above can be successfully avoided with the invention.

Advantageous methods for calculating the optimum times required for cutoff and shutoff are described below.

These and other objects, features and advantages of the present invention will become more readily apparent from the following detailed description when taken in conjunction with the accompanying drawings.

DETAILED DESCRIPTION OF THE DRAWINGS

Figure 1:
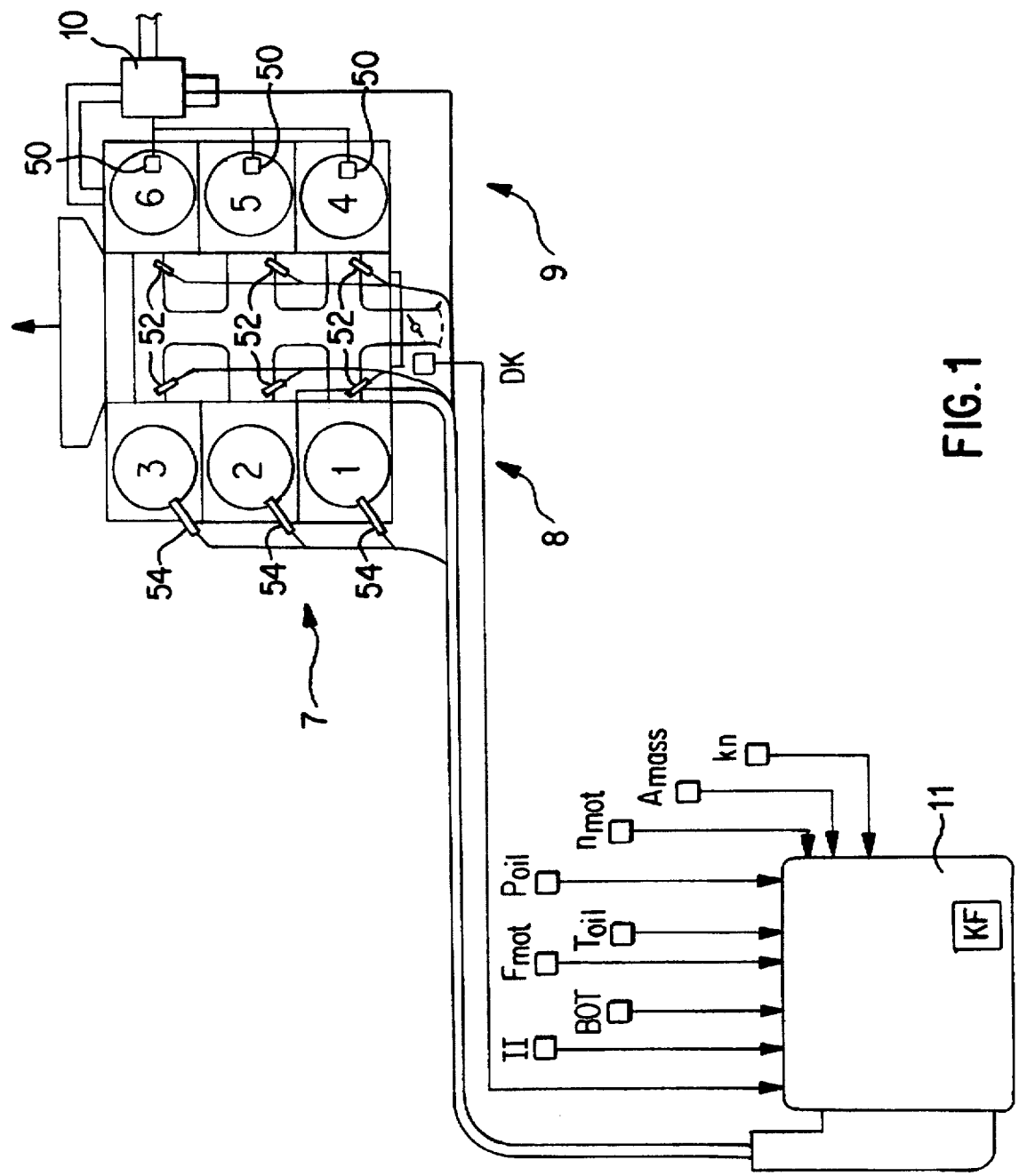
FIG. 1 is a schematic diagram of an internal combustion engine suitable for the application of cylinder cutout according to the present invention.

Internal combustion engine 7 in FIG. 1 is a six-cylinder horizontally-opposed piston engine with cylinders 1 to 6. Cylinders 1 to 3 form a first cylinder bank 8 and cylinders 4 to 6 form a second cylinder bank 9. The gas exchange valves 50 are operated by a camshaft, and the gas exchange valves in second cylinder bank 9 are also capable of being cut in and out. In the present embodiment, the gas exchange valves in second cylinder bank 9 are only cut in when a hydraulic control pressure is applied through a hydraulic valve 10 from a hydraulic pressure source not shown in greater detail. A central control device 11 controls both the internal combustion engine in general and hydraulic valve 10 in particular. For this purpose, control device 11 detects the following parameters: an idle signal II, a reference mark signal from the camshaft BOT, an engine temperature $Tm_{mot}$, an oil temperature of the hydraulic oil $T_{oil}$, an oil pressure of the hydraulic oil $P_{oil}$, a load signal DK generated by the driver, an engine rpm $n_{mot}$, an air mass $A_{mass}$, and a signal from one or more detonation sensors kn. Depending on these parameters, control device 11 generates a signal for injection duration $t_i$, ignition signals ig, as well as a switch signal $Z_{hy}$ for hydraulic valve 10. The injection time $t_i$ and the ignition signal ig are generated separately for each of cylinders 1 to 6 or at least for each of cylinder banks 8 and 9, and are supplied to engine 7.

With the aid of a characteristic map which is not shown and which extends over the air mass $A_{mass}$ and the engine rpm $n_{mot}$ a decision is made in control device 11 as to whether engine 7 is to be operated in three-cylinder operation, i.e. only on cylinders 1 to 3, or in six-cylinder operation, i.e. on cylinders 1 to 6. The starting point for the method described below is that engine 7 is in six-cylinder operation and the limit to three-cylinder operation has now been crossed in the abovementioned characteristic map.

The method described below is applied as a whole to second cylinder bank 9, in other words all of the gas exchange valves 50, the fuel supply 52, and the ignition 54 of second cylinder bank 9 are controlled simultaneously. For this purpose, the method is applied to a single cylinder of cylinder bank 9 and the other cylinders are involved as well. This individual cylinder is selected to be the cylinder to which the worst assumptions apply. In the present application example, this is cylinder 4, which is furthest away from hydraulic valve 10 and thus exhibits the longest delay between the opening of hydraulic valve 10 and the gas exchange valves being cut out or in. It is understood that the method described can be used similarly on individual cylinders when these cylinders can be cut in or out independently of the other cylinders. The further improvement in the exhaust values that results from individual control is not utilized in the present case because the cost required to do so does not yield a corresponding benefit with the current state of the art in gas exchange valves that can be cut in and out; if this technology improves, however, it can be expected that worthwhile results can be achieved with individual control.

The invention will first be described in theory on the basis of the graph shown in FIG. 2. Unless stated otherwise, these parameters always relate to cylinder 4. All of the values of these parameters are plotted as a function of camshaft angle NW; the reference mark on the camshaft BOT is therefore shown as a vertical line and the distance between two reference marks BOT corresponds to four cycles of the internal combustion engine. The following are plotted, from top to bottom: the state of a characteristic map KF in control device 11, the state of a fuel shutoff KTI, the oil pressure $P_{oil}$, and the switch signal $Z_{hy}$.

Before the first reference mark BOT shown, as described above, control device 11 recognizes that a switch to three-cylinder operation is necessary and that second cylinder bank 9 must therefore be cut out. Then control device 11 first determines the total time required to cut out the gas exchange valves $a_g$ and then determines the total time required to cut off fuel supply g. The two total times $a_g$ and g are then compared with one another and a waiting time is added to the shorter total time, so that the two time intervals are the same. In the example shown in FIG. 2, the total time required to cut off fuel supply g is shorter, so that a waiting time $g_w$ is added to it, making the sum of the waiting time gw plus the total time required for cutting off fuel supply g equal to the total time $a_g$ required for cutting out the gas exchange valves. When the next reference mark BOT is reached, both processes, namely the cutout of the gas exchange valves and the cutoff of the fuel supply, are started simultaneously and proceed in parallel. While the cutout of the gas exchange valves starts immediately, the cutoff of the fuel supply does not begin until after the waiting time $g_w$ calculated above has elapsed. It is important for designing the two processes that both procedures be so arranged that they end at the same point in time, so that no additional delays occur between the two processes and hence no time losses occur, except for the necessary delays produced by the method. In the present example the common reference point, namely the end point, of the two processes is selected in a special fashion: both processes terminate at the end of the camshaft base circle GK of cylinder 4 in question (the vertical dashed line in FIG. 2). This means that after line GK is reached, the intake valve of cylinder 4 would open again and thus a new combustion cycle would be initiated. This method hence terminates at the latest possible time, namely the end of the previous operating cycle, and hence with the shortest possible delay.

The individual steps of the method are further described below. The total time $a_g$ required to cut out the gas exchange valves is determined by calculating the sum of a mechanical switching time $a_{mec}$, a time for the hydraulic pressure reduction $a_{hy}$, and a lead time a. The mechanical switching time $a_{mec}$ is the time required by the switching elements on the gas exchange valves to cut out a gas exchange valve when oil pressure $P_{oil}$ falls. The time required for hydraulic pressure reduction $a_{hy}$ is the time required for the oil pressure $P_{oil}$ on the cylinder 4 in question to fall after hydraulic valve 10 has been controlled by switch signal $Z_{hy}$. Time $a_{hy}$ is highly dependent on oil temperature $T_{oil}$ and oil pressure $P_{oil}$. Finally, lead time a takes into account the fact that, depending on the engine rpm $n_{mor}$, the cutout of a gas exchange valve must be initiated earlier in order to end at mark GK at the same camshaft angle NW.

The main reason the above problem arises is that the above parameters in this case are determined as time values and not as angle values. This in turn is due to the control device used in the embodiments, which controls the cutout of the gas exchange valves as a function of time and cuts off the fuel supply (camshaft) under angle control. Nevertheless, it is always times that are involved here, since the basic considerations apply to both time-controlled and angle-controlled processes, provided that special measures are not required, as they are here, by the use of time control and coordination with an angle, in this case the mark GK.

The total time g required to cut off the fuel supply consists primarily of the time $g_{ev}$ required to cut off the fuel supply, in this case fuel injection valves, and a flushing time $g_{flush}$. There is also a safety interval $g_{safe}$. The time $g_{ev}$ required to cut out the injection valves is the time required to terminate all of the combustion processes still under way. In this example, it is therefore at least the time required for one revolution of the camshaft (monitored cylinder 4 has just been injected and must still burn this fuel). Since such an abrupt cutoff of the entire fuel supply to second cylinder bank 9 would involve negative effects on comfort, the fuel supply can be gradually eliminated by additional measures, such as cutting off the fuel supply cylinder by cylinder rather than simultaneously for all the cylinders. This lengthens time $g_{ev}$ accordingly. Flushing time $g_{flush}$ is the time required for each of the cylinders in second cylinder bank 9 to be flushed once with fresh air. During safety interval $g_{safe}$, all of the imponderables that have not yet been taken into account are combined. This value is selected empirically; it ensures that the cylinders to be cut out are under no circumstances being fired any longer, or contain either combustion residues or fuel residues.

Figure 2:
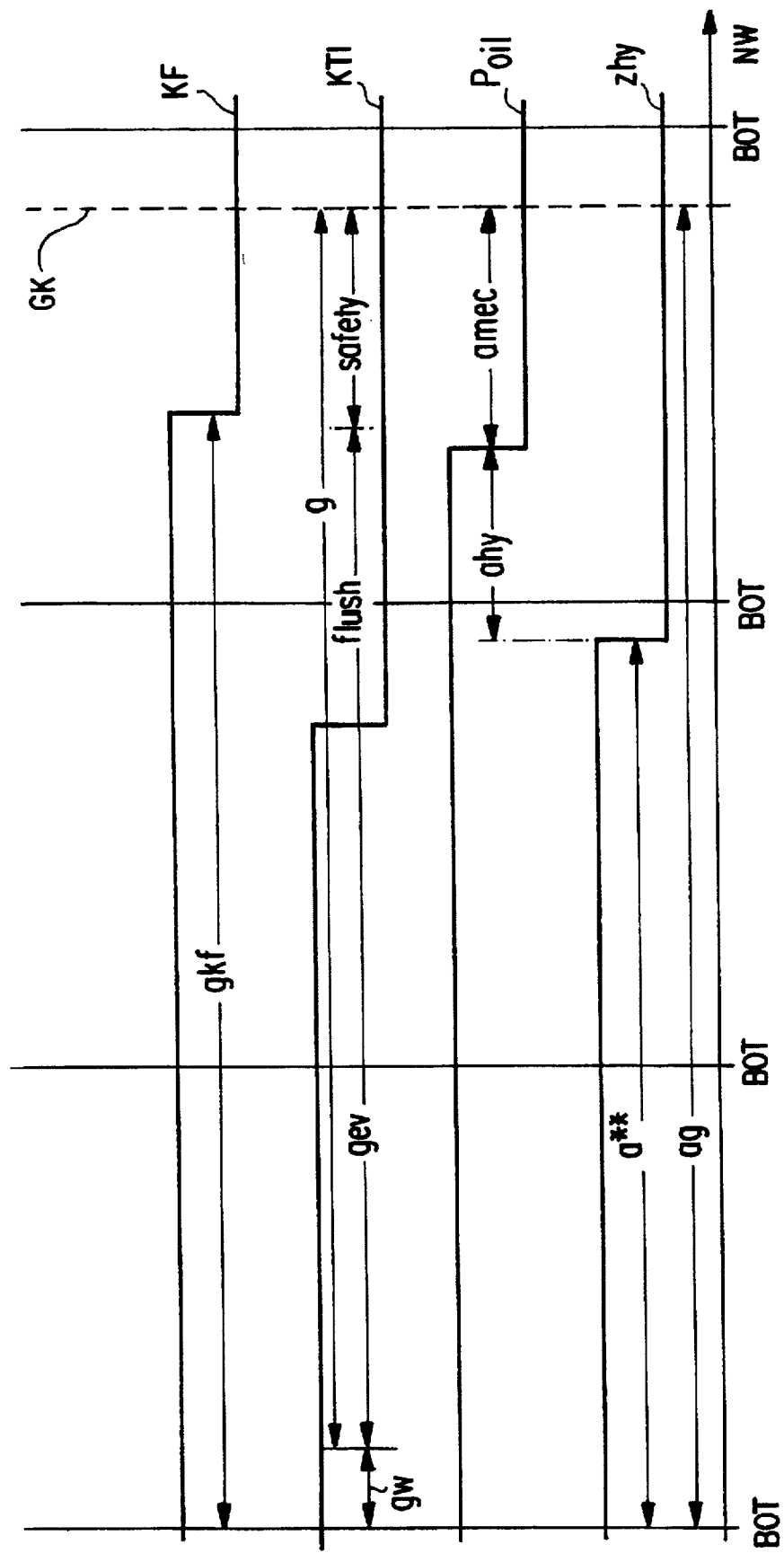
FIG. 2 is a graph showing the cylinder cutout method according to a preferred embodiment of the present invention.

In the graph of the process in FIG. 2, two additional processes are shown as well. One of these is the switching of the value of characteristic map KF from six-cylinder operation (high level) to three-cylinder operation (low level). This characteristic map switch affects the control of ignition and injection by control device 11, which must be different for three-cylinder operation than for six-cylinder operation. This switch likewise takes place with a delay $g_{kf}$ relative to reference mark BOT and must be determined empirically for every engine. The characteristic map switch then occurs between the beginning of fuel cutoff and the points on line GK at which, following complete cutout of the gas exchange valves, the flow conditions in engine 7 have adjusted to the new state and stabilized.

Oil pressure $P_{oil}$ is also monitored for safety and for adaptation of the time $a_{hy}$ required for hydraulic pressure reduction. The delay between the triggering of hydraulic valve 10 by switching signal $Z_{hy}$ and the drop in oil pressure $P_{oil}$ is repeatedly detected and stored as a new time any required for hydraulic pressure reduction.

Alternatively, it is possible to replace the monitoring of oil pressure $P_{oil}$ by another method for determining the operating state of the valve drive (cutting the gas exchange valves in and out). According to one preferred embodiment, the time of valve closure is determined to adjust the operating state of the valve drive. Valve closure is detected using acceleration sensors, which detect the structure-borne noise signal caused by the closing pulse (the valve striking the valve seat). Known detonation sensors can be used for the purpose, with one or more time windows being used to evaluate the signals delivered by the detonation sensors, in contrast to detonation recognition. As in detonation recognition, the time windows are specific for each gas exchange valve, in other words the state of each gas exchange valve can be determined separately. The time windows are also dependent on the currently selected contour of the camshaft, because they are chosen so that a closing pulse can be expected in such a time window. If the contour of the camshaft cannot be changed, the time window can also be chosen as a fixed value.

For further evaluation, the prepared signal is compared with threshold values associated with the various operating states of the valve drive. If, in the present example, the threshold value for the cutout of the gas exchange valve is not reached, the process is interrupted at this point and an error message is triggered. This test, as already mentioned, is valid for the gas exchange valve checked with the time window. The scope of the test depends on the device used to cut the gas exchange valves in and out. If the device acts to force all of the gas exchange valves involved to switch, only one cylinder need be tested, in this case cylinder 4. If the device on the other hand switches each gas exchange valve individually, it makes sense under certain conditions to test separately the switching state of each gas exchange valve involved. Of course, the method described above also permits detection of the operating state of the valve drive to determine the actual time required for pressure reduction, with the time that elapses between the delivery of switching signal $Z_{hy}$ and the recognition of a closing pulse being determined. Then the time $a_{hy}$ required for hydraulic pressure reduction can be compared once more and the time $a_{hy}$ required for hydraulic pressure reduction can be adjusted.

Figure 3:
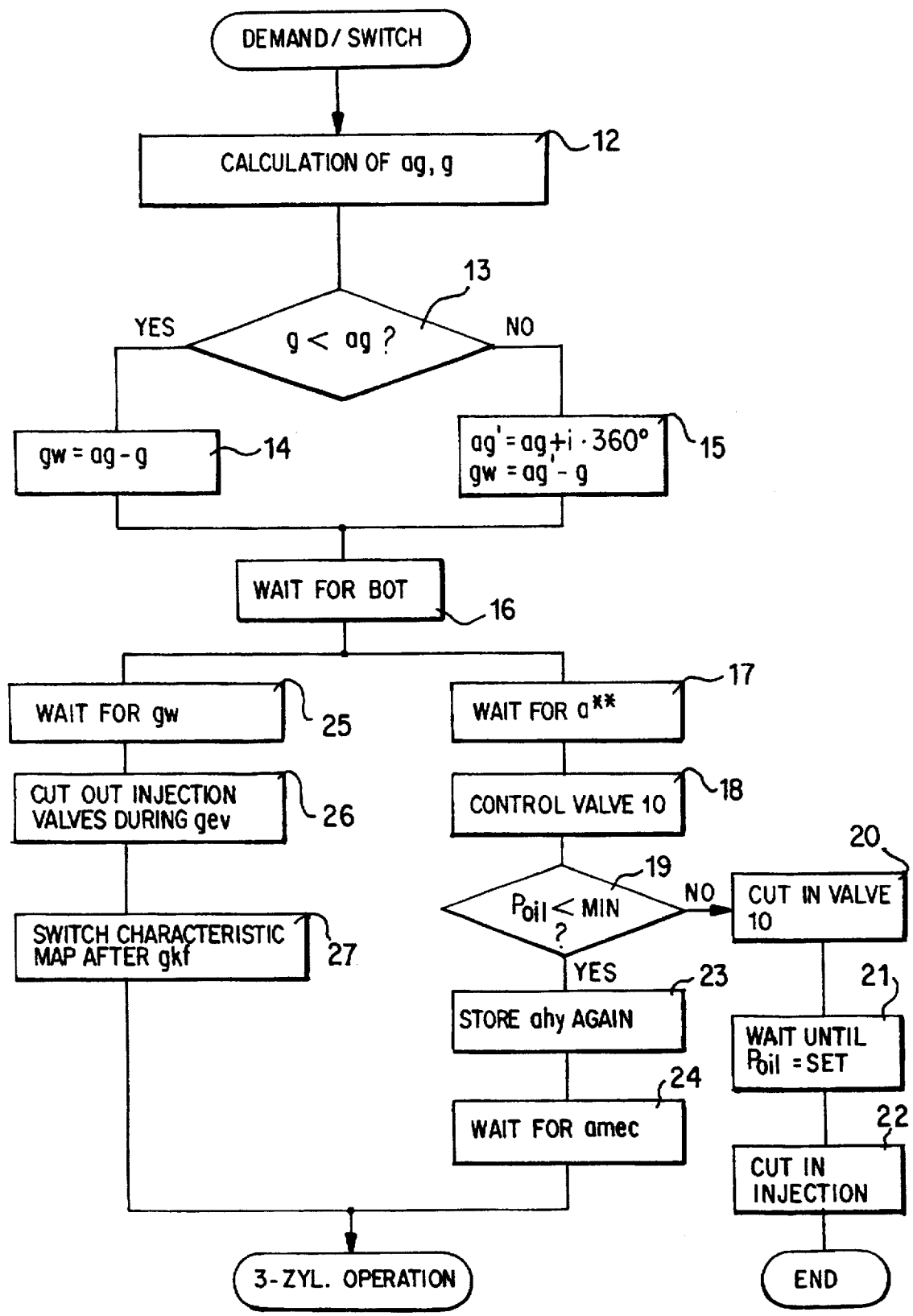
FIG. 3 is a process flowchart showing the method according to a preferred embodiment of the present invention.

FIG. 3 shows the entire process once again in the form of a process flowchart. The process begins with the call for a shift. Initially, in Step 12, the total time $a_g$ required to cut out the gas exchange valves and the total time g required to cut off the fuel supply are determined. In Step 13 a comparison is conducted to determine whether it would take longer to cut out the gas exchange valves or to cut off the fuel supply. If cutting out the gas exchange valves would take longer, the wait $g_w$ until the fuel supply is cut off is determined in Step 14 as the difference between the total time $a_g$ required to cut out the gas exchange valves and the total time g required to cut off the fuel supply.

In the other case, the calculation is somewhat more difficult since lead time a cannot be lengthened at will. In devices for cutting out gas exchange valves, the conditions determined for performing a switch must be observed as a rule; as in the example, this can include such things as a switching process being able to be initiated only when the valves to be switched have just closed. However, this occurs only once per revolution of the camshaft, so that lead time a can only be lengthened in steps of one whole camshaft revolution. For this reason, in Step 15 a new total time $a_g$, required to cut out gas exchange valves is calculated from the old total time $a_g$ plus the integral multiple of the time required for one complete camshaft revolution. As a result of this prolongation, the total time $a_g$, required to cut out the gas exchange valves becomes longer than the total time g required to cut off the fuel supply so that a lead time $g_w$ for cutting off the fuel supply must be determined simultaneously, once again in known fashion.

After the calculations described above have been completed, the reference mark signal BOT is awaited in Step 16. After reference mark BOT has been reached, both processes proceed in parallel: the gas exchange valves are cut out and the fuel supply is cut off.

In Step 17 the lead time a** is initially awaited to cut out the gas exchange valves. Then valve 10 is controlled in Step 18, while in Step 19 the oil pressure $P_{oil}$ is monitored to determine whether the oil pressure has reached its set value after the time $a_{hy}$ required for hydraulic pressure reduction plus a tolerance time has elapsed. If this is not the case, hydraulic valve 10 is cut in again in Step 20, since it must be assumed that the gas exchange valves have not been switched. In Step 21 a check is made to determine whether oil pressure $P_{oil}$ has again reached its set value, and the fuel supply is finally cut in again in Step 22. In this case, the process ends with an error message.

If it is determined in Step 19 that oil pressure $P_{oil}$ has dropped below its limiting value in proper time, in Step 23 the time determined above is stored as the new time required for hydraulic pressure reduction, and may be stored as a function of the prevailing operating parameters. Cutout of the gas exchange valves ends in Step 24 after the mechanical switching time $a_{mec}$.

Parallel to the cutout of the gas exchange valves, the cutoff of the fuel supply in Step 25 begins with the expiration of waiting time $g_w$. In Step 26, during the time $g_{ev}$ required for cutoff of the fuel supply, the injection valves are cut out, cutting off the fuel supply. The flushing time $g_{flush}$ calculated previously as well as the previously calculated safety interval $g_{safe}$ need not be included any longer as steps in the process, since the cylinders are automatically flushed as a result of the operation of second cylinder bank 9 with the fuel supply cut off and with the gas exchange valves still active. In Step 27, not necessarily after Step 26 since it is not involved in the previous process, after expiration of lead time $g_{kf}$ the characteristic maps of control device 11 are switched from six-cylinder to three-cylinder operation.

Figure 4:
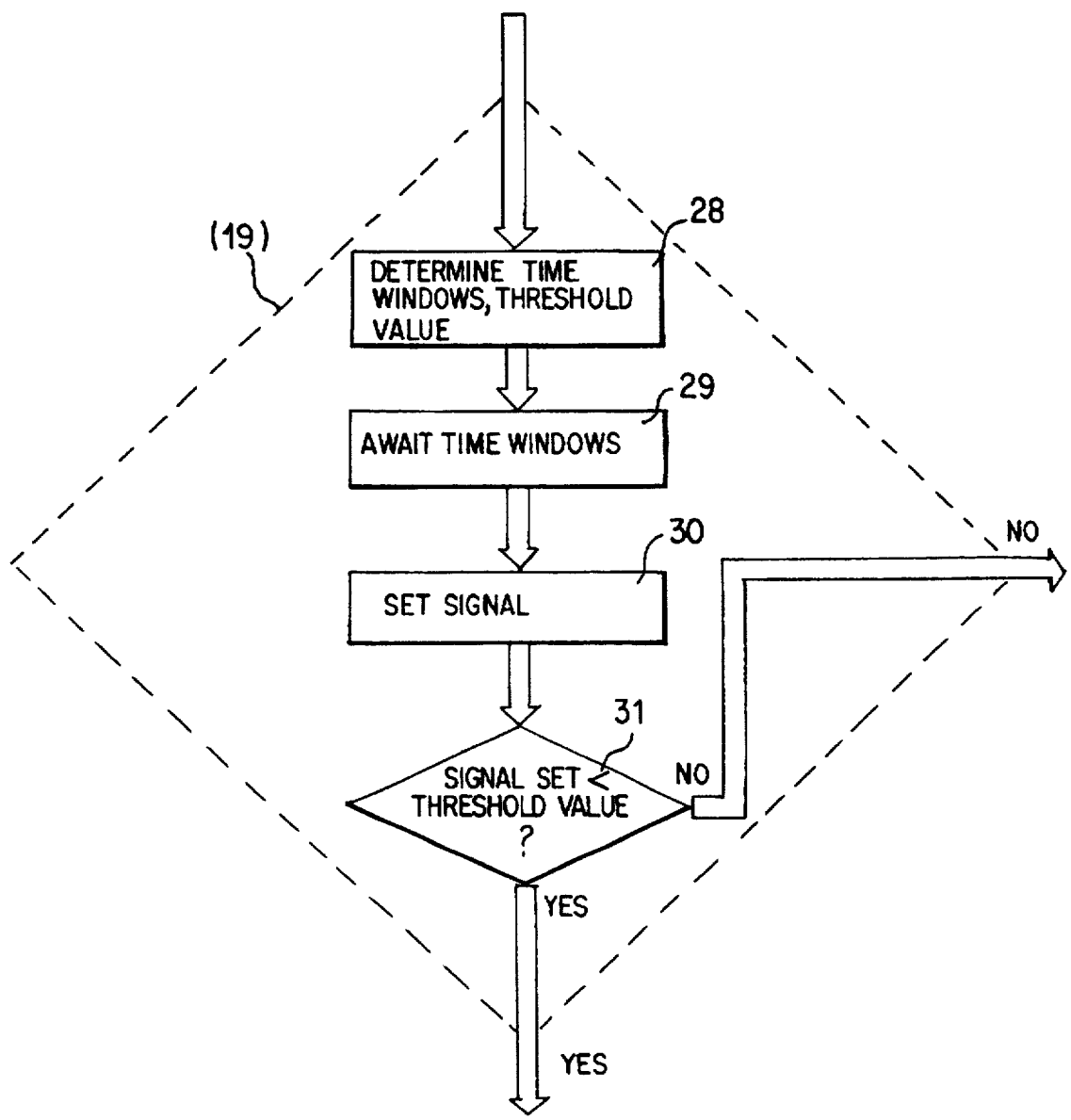
FIG. 4 is a process flowchart showing the process of an alternative to Step 19 in FIG. 3.

Alternatively, monitoring of oil pressure $P_{oil}$ in Steps 19 to 21 may be replaced by a method for determining the operating state of the valve drive (cutting the gas exchange valves in and out), in which the point in time of valve closure is determined. This method is shown in FIG. 4; the steps shown here replace Step 19 in FIG. 3. In Step 28 the time windows valid for the currently selected camshaft contour and the corresponding threshold value for the closing pulse are determined from a table. If neither the contour or the rotation angle position of the camshaft can be changed, both values are constant and Step 28 can be eliminated. In Step 29 the previously determined time windows are awaited and in Step 30 the signal delivered by the detonation sensor is set. In Step 31 the previously set signal is compared with the threshold value. If the threshold value has not been undershot, the gas exchange valve tested with the selected time window has not been cut out and a branch takes place to Step 20 in FIG. 3. On the other hand, if the threshold value has been undershot, the tested gas exchange valve has been cut out and the process continues at Step 23 in FIG. 3.

The test in Step 21 in FIG. 3 can then take place following the process described above, with a test then being conducted to determine whether the gas exchange valves are cut in. If the test in Step 19 is a general one, in other words for all of the gas exchange valves in common, the test according to Step 21 can be eliminated. On the other hand, if the test in Step 19 is cylinder-specific, the branch takes place as early as after Step 20, even if only one gas exchange valve is cut in. In this case, the test in Step 21 must provide assurance that all of the gas exchange valves, even the ones that were cut out before, have been cut in once again.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for cylinder cutout in an internal combustion engine having a plurality of cylinders, at least one of the cylinders having switchable charge exchange valves and a switchable fuel supply, the switchable charge exchange valves and the switchable fuel supply being switchable between a cut-in state and a cutout state, wherein the method comprises the steps of:

determining a valve cutout time required to cut out the charge exchange valves, determining a fuel cutout time required to cut out the fuel supply, comparing the valve cutout time with the fuel cutout time, determining a fuel cutout waiting time for initiating a cutout of the fuel supply, when the fuel cutout time is shorter than the valve cutout time, determining a valve cutout waiting time for initiating a cutout of the charge exchange valves, when the fuel cutout time is longer than the valve cutout time, and initiating the cutout of the charge exchange valves and the cutout of the fuel supply after reaching a next reference mark of the internal combustion engine and after a subsequent expiration of the respective waiting times.

2. A method according to claim 1, wherein the switchable charge exchange valves are controlled by a hydraulic pressure, and wherein the valve cutout time is determined according to the following steps:

determining a pressure reduction time required to reduce the hydraulic pressure below a cutout threshold, determining a mechanical switching time required for complete mechanical cutout of the charge exchange valves, and adding the pressure reduction time to the mechanical switching time to determine the valve cutout time.

3. A method according to claim 1, wherein the fuel cutout time is determined according to the following steps:

determining a fuel injection cutout time required to cut off the fuel injection from all of the cylinders to be cut out, determining a flushing time required to flush at least once all the cylinders to be cut out, and adding the fuel injection cutout time to the flushing time to determine the fuel cutout time.

4. A method according to claim 1, wherein said valve cutout time and said fuel cutout time are determined based upon a cylinder which has the longest valve cutout time or fuel cutout time.

5. A method according to claim 1, wherein the valve cutout time is determined such that the cutout of the charge exchange valves is completed at an end of a camshaft base circle.

6. A method according to claim 1, wherein said valve cutout time, said fuel cutout time, and said waiting times are determined as angular functions of a camshaft.

7. A method according to claim 1, wherein a process for cutting out the charge exchange valves is initiated simultaneously with a process for cutting out the fuel supply after reaching the next reference mark of the internal combustion engine, wherein the process for cutting out the charge exchange valves comprises the following steps:

waiting for said valve cutout waiting time for cutout of the charge exchange valves to begin, issuing a command to cut out the charge exchange valves, testing an operating state of the charge exchange valves to determine if the charge exchange valves have been cut out, and interrupting cylinder cutout if said testing shows that not all of the charge exchange valves are cut out, and wherein the process for cutting out the fuel supply comprises the following steps:

waiting for said fuel cutout waiting time for the cutout of the fuel supply to begin, and cutting off the fuel supply.

8. A method according to claim 7, wherein said interrupting cylinder cutout comprises the following steps:

issuing a command to cut in the charge exchange valves, waiting until a test of the operating state of the charge exchange valves indicates that all the charge exchange valves have been cut in, and cutting in the fuel supply for all cylinders.

9. A method according to claim 8, wherein the switchable charge exchange valves are controlled by a hydraulic pressure, and wherein said testing an operating state of the charge exchange valves comprises the following steps:

cutting off the hydraulic pressure, waiting for a predetermined time normally required to reduce the hydraulic pressure, and testing whether the hydraulic pressure has fallen below the cutout threshold:

determining that the charge exchange valves have been cut out if the hydraulic pressure has fallen below the cutout threshold, and determining that the charge exchange valves have not been cut out if the hydraulic pressure has not fallen below the cutout threshold.

10. A method according to claim 8, wherein said testing an operating state of the charge exchange valves comprises the following steps:

determining each of a time window valid for a camshaft contour currently selected and a corresponding closing pulse threshold value for a closing pulse of the charge exchange valves, waiting for said time window, sensing a detonation signal delivered by a detonation sensor, and comparing the detonation signal with the closing pulse threshold value:

determining that the charge exchange valves have been cut out if the detonation signal is below the closing pulse threshold value, and determining that the charge exchange valves have not been cut out if the detonation signal is not below the closing pulse threshold value.

11. A method according to claim 7, wherein the switchable charge exchange valves are controlled by a hydraulic pressure, and wherein said testing an operating state of the charge exchange valves comprises the following steps:

cutting off the hydraulic pressure, waiting for a predetermined time normally required to reduce the hydraulic pressure, and testing whether the hydraulic pressure has fallen below the cutout threshold:

determining that the charge exchange valves have been cut out if the hydraulic pressure has fallen below the cutout threshold, and determining that the charge exchange valves have not been cut out if the hydraulic pressure has not fallen below the cutout threshold.

12. A method according to claim 7, wherein said testing an operating state of the charge exchange valves comprises the following steps:

determining each of a time window valid for a camshaft contour currently selected and a corresponding closing pulse threshold value for a closing pulse of the charge exchange valves, waiting for said time window, sensing a detonation signal delivered by a detonation sensor, and comparing the detonation signal with the closing pulse threshold value:

determining that the charge exchange valves have been cut out if the detonation signal is below the closing pulse threshold value, and determining that the charge exchange valves have not been cut out if the detonation signal is not below the closing pulse threshold value.

\* \* \* \* \*